No. 740,411. PATENTED OCT. 6, 1903.
V. FLANNIGAN & J. R. PARTRIDGE.
RAIL JOINT.
APPLICATION FILED JULY 17, 1903.
NO MODEL.
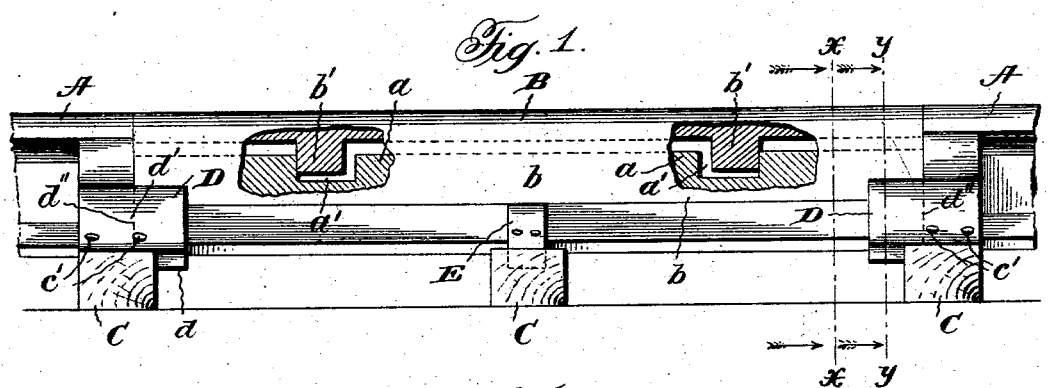
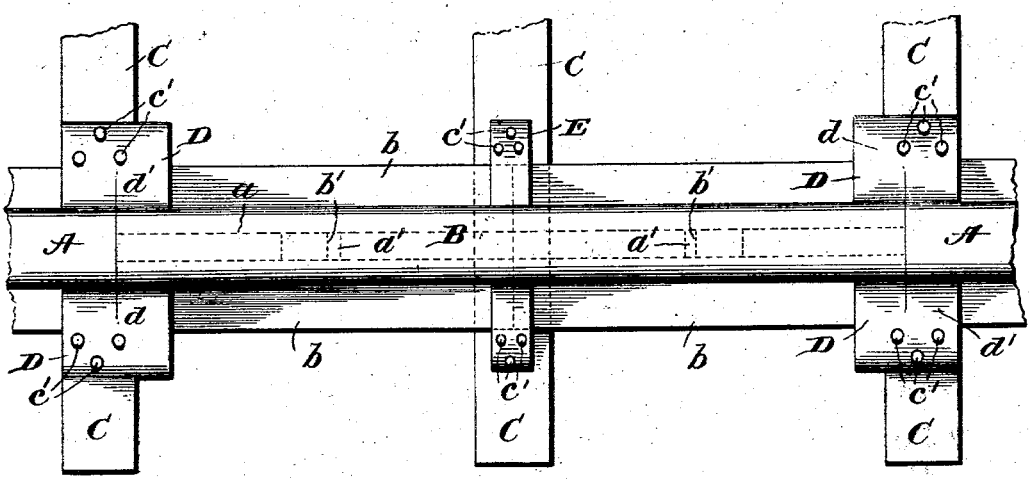
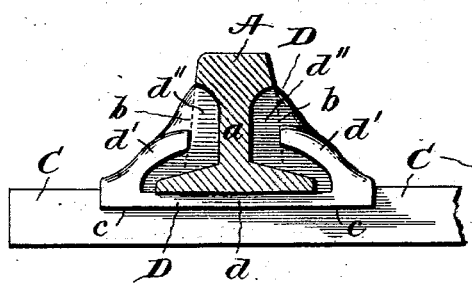
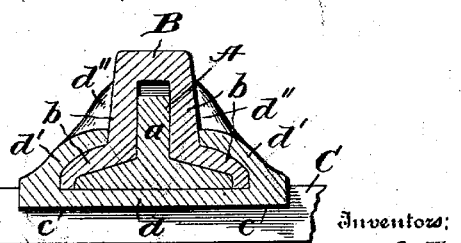
Witnesses:
Jas. E. Hutchinson.
Inventors:
Vincent Flannigan and
Joseph R. Partridge,
Attorneys No. 740,411. Patented October 6, 1903.

UNITED STATES PATENT OFFICE.

VINCENT FLANNIGAN AND JOSEPH R. PARTRIDGE, OF HOUTZDALE, PENNSYLVANIA.

RAIL-JOINT.

SPECIFICATION forming part of Letters Patent No. 740,411, dated October 6, 1903.

Application filed July 17, 1903. Serial No. 165,969. (No model.)

*To all whom it may concern:*

Be it known that we, VINCENT FLANNIGAN and JOSEPH R. PARTRIDGE, citizens of the United States, residing at Houtzdale, in the county of Clearfield and State of Pennsylvania, have invented certain new and useful Improvements in Rail-Joints, of which the following is a specification, reference being had therein to the accompanying drawings.

This invention relates to improvements in rail-joints, and has for its object the provision of a joint adapted for use in coupling together the ends of rails of various types, but possessing characteristics which make the same practical and desirable for use in connection with long rails.

Heretofore the use of very long rails has been objectionable, because the contraction of the same caused too large a space or gap between the adjoining ends thereof, which destroyed the element most sought in a commercially practical road—continuity and consequent smoothness in tread-surface.

Unsuccessful attempts have been made to produce a joint which would enable the employment of longer rails than those at present in vogue by the utilization of a short section of rail interposed between the adjacent ends of the long sections, whereby the separation caused by the contraction of the rails was distributed at the ends of said intermediate short section, the results being unfavorable by reason of the impracticability of the peculiar means for securing the sections of rail in operative relation while permitting a limited sliding engagement therebetween, a series of bolts and slots being ordinarily employed for this purpose.

The present invention contemplates a joint in general of the type just referred to wherein a relatively short section forms an important factor, in combination with means for securing said section in a normal fixed position and instrumentalities devoid of bolts and nuts affording a limited sliding engagement between the respective ends of the short section and the end of its adjoining long section, all as will more fully hereinafter appear.

Novel details in the construction and arrangement of the several parts of a joint made in accordance with our invention will be apparent from the following detailed description when read in connection with the accompanying drawings, forming part hereof, and wherein a preferable embodiment of the invention is illustrated.

Figure 1 is a side elevation of the joint, parts being shown in section. Fig. 2 is a top plan view. Fig. 3 is a cross-section on the line X X of Fig. 1, the coupling-section being omitted; and Fig. 4 is a similar section on line Y Y, same figure.

Referring more specifically to the drawings, A A represent the ends of rail-sections designed to be coupled together. These rails in cross-section are of the customary I shape and at their ends have portions of the tread cut away to expose the upper edge of the web $a$, said web in turn being provided with a recess $a'$, opening upwardly, for a purpose to be presently defined.

Adapted to overlie the exposed portions of the web $a$ is a relatively short coupling-section B, the same being of inverted-U shape and having along its lower edges downwardly-flaring flanges $b$, arranged to rest upon the base or securing-flanges of the rail-sections A, the sides of the section B taking the place of the usual fish-plates. The upper surface of the section B is fashioned to lie flush with the tread-surface of the sections A, so as to form in conjunction therewith a substantially continuous tread-surface, as will be readily understood.

The coupling-section, for solidity in structure and also convenience in fastening the same in place, is preferably of a length to extend across three ties C, spaced the ordinary distance apart, and the section is secured against movement to these ties through the medium of chairs D D at the ends thereof, and, if necessary, an intermediate chair E, embracing the flanges $b$ and fastened to the center tie, which will directly sustain the free ends of the rail-sections from becoming depressed.

Each chair D comprises a bottom $d$ and upwardly and inwardly extending portions forming braces $d'$, the inner faces of which are hollowed out adjacent to one edge of the chair to fit snugly over the end of the coupling-section B, while near the opposite edge of the chair the same is formed to snugly engage over the rail A and beneath its tread, Fig. 4. The upper surface of the bottom $d$ of the chairs is flat throughout, so that the base of the rails A may rest firmly thereupon, and the special configuration of the interior of said chairs provides oppositely-disposed shoulders or stops $d''$, arranged to abut against the ends of the coupling-section B, whereby any shifting of said section from a predetermined normal position is positively prevented. Any suitable means may be employed for rigidly securing the chairs to the ties C, a convenient method being to form seats $c$ in the ties for the reception of the chairs and to fasten the chairs in said seats by spikes $c'$.

In the channel of the coupling-section B, at points adjacent to the respective ends of said section, are integral lugs $b'$, arranged to project into the recesses $a'$ in the webs $a$ of the rail-sections A, the length of said lugs being slightly less than that of the recesses, whereby a limited amount of play of the rails A over the lugs is permitted.

It will be appreciated that by the arrangement of the coöperating lugs and recesses it is impossible that more than a predetermined amount of separation can take place between each end of the coupling-section and the rail-sections and that any further separation necessitated by the excessive contraction of the rail-sections is necessarily distributed at the two points of the next joint in series.

The joint above described is, as heretofore stated, primarily designed for extra-long rail-sections, the use of which is prohibited by single joints providing but one point of separation rather than a double joint, such as the present, affording two points of separation. By the use of the former so-called "single" joints the length of the rail-sections is limited, for instance, to thirty feet; but in the use of the latter or "double" joint the sections may be at least double that length, or sixty feet, because the increased separation therebetween is distributed at several points, as before explained.

While a particular embodiment has been disclosed herein, it is not our intention to be restricted to any details thereof except in so far as any such details are specifically included in the appended claims, as slight changes and alterations may obviously be made without in the least departing from the spirit of the invention.

Having thus described the invention, what is claimed as new, and desired to be secured by Letters Patent, is—

1. In a rail-joint, a coupling-section adapted to slidably engage the sections to be joined, instrumentalities for securing the coupling-section in place including means for engaging the end portions of said section to prevent endwise movement thereof, and means on the interior of the coupling-section for limiting the endwise movement of the other sections.

2. In a rail-joint, a coupling-section adapted to slidably engage the sections to be joined, instrumentalities for securing the coupling-section in place including fixed abutments for the ends of said section to prevent endwise movement thereof, and means on the interior of the coupling-section for limiting endwise movement of the other sections.

3. In a rail-joint, a coupling-section adapted to slidably engage the sections to be joined, chairs for securing the coupling-section in place, and upwardly-projected means carried by the chairs for engaging the end portions of said section to prevent endwise movement thereof.

4. In a rail-joint, a coupling-section adapted to slidably engage the sections to be joined, chairs for securing the coupling-section in place adapted to embrace the sides of the sections to be joined, and fixed abutments on the chairs for engaging the ends of said section to prevent endwise movement thereof.

5. In a rail-joint, a coupling-section adapted to slidably engage the sections to be joined, and chairs for securing the coupling in place, each chair comprising a base portion, means for engaging the end portion of a rail-section, and means for engaging the end portion of the coupling-section.

6. In a rail-joint, a coupling-section adapted to slidably engage the sections to be joined, and chairs for securing the coupling in place, each chair comprising a base portion, means for engaging the end portion of a rail-section, means for engaging the end portion of the coupling-section, and an abutment between said last two mentioned means for engaging the end of the coupling-section.

7. In combination with a pair of rail-sections, a joint therefor comprising a coupling-section, a slidable lug-and-recess connection between said rail-sections and coupling-section, and instrumentalities for securing the coupling-section in place including means for engaging the end portions of said section to prevent endwise movement thereof.

8. In combination with a pair of rail-sections, a joint therefor comprising a coupling-section, a slidable lug-and-recess connection between said rail-sections and coupling-section, and instrumentalities for securing the coupling-section in place including fixed abutments for the ends of said section to prevent endwise movement thereof.

9. In combination with a pair of rail-sections, a joint therefor comprising a coupling-section, a slidable lug-and-recess connection between said rail-sections and coupling-section, chairs for securing the coupling-section in place, and means carried by the chairs for engaging the end portions of said section to prevent endwise movement thereof.

10. In combination with a pair of rail-sections, a joint therefor comprising a coupling-section, a slidable lug-and-recess connection between said rail-sections and coupling-section, chairs for securing the coupling-section in place, and fixed abutments on the chairs for engaging the ends of said section to prevent endwise movement thereof.

11. In combination with a pair of rail-sections, a joint therefor comprising a coupling-section, a slidable lug-and-recess connection between said rail-sections and coupling-section, and chairs for securing the coupling in place, each chair comprising a base portion, means for engaging the end portion of a rail-section, and means for engaging the end portion of the coupling-section.

12. In combination with a pair of rail-sections, a joint therefor comprising a coupling-section, a slidable lug-and-recess connection between said rail-sections and coupling-section, and chairs for securing the coupling in place, each chair comprising a base portion, means for engaging the end portion of a rail-section, means for engaging the end portion of the coupling-section, and an abutment between said last two mentioned means for engaging the end of the coupling-section.

13. In combination with a pair of rail-sections, a coupling-section, means for slidably connecting the rail-sections to the coupling-section, means for securing the coupling-section in place including means for preventing endwise movement of said coupling-section, and means for limiting the endwise movement of the rail-sections away from the coupling-section.

14. In combination with a rail-section provided with a recess, a coupling member adjoining the end thereof, a lug on said coupling member adapted to project into said recess to constitute a sliding connection, and means for securing the coupling member in place against endwise movement.

15. In combination with a rail-section provided with a recess, a coupling member U shape in inverted cross-section, a lug on the interior of said coupling member adapted to project into said recess to constitute a sliding connection, and means for securing the coupling member in place.

16. In combination with a rail-section provided with a recess, a hollow coupling member, a lug on the interior of said coupling member adapted to project into said recess to constitute a sliding connection, and means for securing the coupling member in place against endwise movement.

17. In combination, a rail-section and a coupling-section, one of said sections being provided with a recess, a lug on the other section coöperating with said recess to constitute a sliding connection, and means for securing the coupling member in place.

18. In combination, a rail-section and a coupling-section U shape in inverted cross-section, one of said sections being provided with a recess, a lug on the other section coöperating with said recess to constitute a sliding connection, and a stop for limiting the endwise movement of the rail-section away from the coupling-section and means for securing the coupling member in place.

19. In combination, a rail-section and a hollow coupling-section, one of said sections being provided with a recess, a lug on the other section coöperating with said recess to constitute a sliding connection, and a stop for limiting the endwise movement of the rail-section away from the coupling-section and means for securing the coupling member in place.

20. In combination, a pair of rail-sections and an intermediate coupling-section, means for securing the coupling-section in place, and a slidable connection between each end of the coupling-section and a rail-section comprising a lug on one of said sections coöperating with a recess in the other of said sections, said connection constituting a stop for limiting the endwise movement of the rail-sections away from the coupling-sections.

21. In combination, a pair of rail-sections and an intermediate coupling-section U shape in inverted cross-section, means for securing the coupling-section in place, and a slidable connection between each end of the coupling-section and a rail-section comprising a lug on one of said sections coöperating with a recess in the other of said sections, said connection constituting a stop for limiting the endwise movement of the rail-sections away from the coupling-sections.

22. In combination, a pair or rail-sections and an intermediate hollow coupling-section, means for securing the coupling-section in place, and a slidable connection between each end of the coupling-section and a rail-section comprising a lug on one of said sections coöperating with a recess in the other of said sections, said connnection constituting a stop for limiting the endwise movement of the rail-sections away from the coupling-sections.

In testimony whereof we affix our signatures in presence of two witnesses.

VINCENT FLANNIGAN.
JOSEPH R. PARTRIDGE.

Witnesses:
HARRY G. BIRKHOLDER,
CHARLES F. SMITH.